(12) United States Patent
Teich et al.

(10) Patent No.: US 6,490,631 B1
(45) Date of Patent: Dec. 3, 2002

(54) MULTIPLE PROCESSORS IN A ROW FOR PROTOCOL ACCELERATION

(75) Inventors: Paul R. Teich, Austin, TX (US); Sherman Lee, Rancho Palos Verdes, CA (US)

(73) Assignee: Advanced Micro Devices Inc., Sunnyvale, CA (US)

(*) Notice: Subject to any disclaimer, the term of this patent is extended or adjusted under 35 U.S.C. 154(b) by 677 days.

(21) Appl. No.: 08/915,738

(22) Filed: Aug. 21, 1997

Related U.S. Application Data

(60) Provisional application No. 60/038,953, filed on Mar. 7, 1997.

(51) Int. Cl.[7] .............................. G06F 9/44; G06F 9/46; H04L 29/02
(52) U.S. Cl. .......................... 709/250; 709/230; 709/34
(58) Field of Search ................................ 709/250, 230, 709/319, 321, 327, 231, 232, 233, 234, 235; 370/463

(56) References Cited

PUBLICATIONS

Ito et al. "A Multiprocessor Approach for Meeting the Processing Requirements for OSI," IEEE JSAC, v.11, N.2, Feb. 1993, pp.220–227.*

\* cited by examiner

*Primary Examiner*—Dung C. Dinh
(74) *Attorney, Agent, or Firm*—Foley & Lardner

(57) ABSTRACT

A protocol accelerator includes a first processor connected to a host machine and programmed to provide a first protocol layer for data to be sent to a destination device. A second processor is connected to the first processor and is programmed to provide a second protocol layer for the data. A third processor is connected to the second processor and is programmed to provide a third protocol layer for the data. The third processor is connected to a network by which the data is sent to the destination device. The system can be configured for any number of protocol layers, by providing a dedicated processor in a pipelined configuration for each respective layer.

12 Claims, 4 Drawing Sheets

MULTIPLE PROCESSORS IN A ROW FOR PROTOCOL ACCELERATION

RELATED APPLICATIONS

This application claims priority to provisional application No. 60/038,953, filed Mar. 7, 1997.

BACKGROUND OF THE INVENTION

1. Field of the Invention

The invention relates to the use of multiple processors in a sequential configuration for accelerating the encoding and decoding of a protocol for data transfer. More particularly, the invention relates to the use of multiple processors sequentially arranged to perform a respective protocol conversion application to the data as it passes from one processor to another processor in the sequential chain.

2. Description of the Related Art

Protocols are the standards that are used to specify how data is represented when it is transferred from one machine to another machine. Protocols specify how the transfer occurs, how errors are detected, and how acknowledgements used in a data transfer procedure are passed from machine to machine.

In order to simplify protocol design and implementation, communication tasks are typically segregated into separate subtasks that can be solved independently of each other. Each subtask is typically assigned a unique protocol, or protocol layer.

Layered protocols provide a conceptual framework for protocol design. In a layered protocol, each layer handles one part of the communications task, which typically corresponds to one protocol. For layered protocols, the ith software implementing layer on the destination machine receives exactly what the ith software implementing layer on the source machine sends. That is, the ith layer at the destination machine receives exactly the same object sent by ith layer at the source machine.

The layered protocol concept allows the protocol designer to focus attention on one layer at a time, without being concerned about how the other layers perform. For example, in a file transfer application, the protocol designer need only be concerned with two copies of the application program executing on two machines and what needs to be done in order to perform the file transfer exchange between the machines. The protocol designer makes the assumption that the application at the destination machine receives exactly what the application at the source machine sends.

FIG. 1 shows an example of a layered protocol, in which four layers are utilized to send data between Host A and Host B. The highest layer is the Application layer 110, the second highest layer is the Transport layer 120, the third highest layer is the Internet layer 130, and the lowest layer is the Network interface layer 140. As can be seen from FIG. 1, the Application layer 110 of the destination machine, say Host B, receives exactly the same message sent by the Application layer 110 of the source machine (Host A). The Transport layer 120 of the destination machine receives exactly the same packet sent by the Transport layer 120 of the source machine. The Internet layer 130 of the destination machine receives exactly the same datagram sent by the Internet layer 130 of the source machine. Lastly, the Network Interface layer 140 of the destination machine receives exactly the same frame sent by the Network Interface layer 140 of the source machine.

A frame of data passes from one machine to the other machine over the physical network 150, as seen from FIG. 1. FIG. 1 shows a simple transfer over a single network 150, and FIG. 2 shows a more complex transfer over multiple networks, using a router R between the first network 160 and the second network 170. As can be seen from FIG. 2, message delivery uses two separate network frames, one frame 180 for the transmission from Host A to router R, and another frame 185 from router R to host B. The frame 180 delivered to router R is exactly the same frame sent from host A, but it differs from the frame 185 sent between router R and host B. The same is true of the datagram 190 sent between host A and router R, and the datagram 195 sent between router R and host B.

The application layer 110 and the transport layer 120 deal with end-to-end issues, and are designed so that the software at the source (i.e., host A) communicates with its respective equivalent at the ultimate destination (i.e., host B). Thus, the packet 197 received by the transport layer 120 at host B is identical to the packet 197 sent by the transport layer 120 at host A. Further, the message 199 received by the application layer 110 is identical to the message 199 sent by the application layer 110 at host A.

The higher level layers deal primarily with end-to-end transfers, and the lower level layers deal primarily with single machine transfers. Thus, the ultimate destination (i.e., host B) may not receive the identical datagram 190 sent by the ultimate source (i.e., host A). For example, the header field of the datagram 190 is changed as it passes through the router R, for example.

FIG. 3 shows how the different layers are used to send data from a source machine to a destination machine over multiple networks. A sender on the source machine 310 transmits a message, which the IP layer 320 places in a datagram and sends across the first network 330 via the interface 340. The intermediate machine 350 receives the message on the first network 330 via its interface 340, passes the message up to the IP layer 320 of the intermediate machine 350, and routes the message onto a second network 360 via its interface 340. The intermediate machine 370 receives the message on the second network 360 via its interface 340, passes the message up to the IP layer 320 of the intermediate machine 370, and routes the message onto a third network 380 via its interface 340. The destination machine 390 receives the message on the third network 380 via its interface 340, the IP layer 320 of the destination machine 390 extracts the message, and the message is passed up to the higher layers 395 of protocol software, to be eventually received at the receiver 397. Note that the message was not passed up through the higher levels of protocol software by each of the intermediate machines 350, 370, since they had no need to extract the message, but only to pass it on to the desired destination machine.

Conventional layered protocols include TCP/IP, X.25 and ISO (also known as OSI). The TCP/IP protocol is a four-layered protocol, and the ISO protocol is a seven-layered protocol. The seven layers of the ISO protocol are: application layer (layer 7), presentation layer (layer 6), session layer (layer 5), transport layer (layer 4), network layer (layer 3), data link layer (layer 2), and physical hardware connection layer (layer 1).

The X.25 network consists of packet switches that contain the logic needed to route packets through the network. Hosts attach to one of the packet switches using a serial communication line, and hosts must follow a predetermined procedure in order to transfer packets onto the network and retrieve packets from the network.

At the physical layer, X.25 specifies a standard for the physical interconnection between host computers and network packet switches, as well as the procedures used to transfer packets from one machine to another.

The data link layer specifies how data travels between a host and the packet switch to which it connects. The data link layer defines the format of frames and specifies how the machines are to recognize frame boundaries, and well as providing error detection.

The network layer specifies the functionality for completing the interaction between the host and the network, and it defines the basic unit of transfer across the network. The network layer includes the concepts of destination addressing and routing. The network might allow packets defined by network layer protocols to be larger than the size of frames that can be transferred at the data link layer. The network layer software assembles a packet in the form the network expects and uses the data link layer to transfer it (presumably in multiple packets) to the packet switches. The network layer also responds to congestion problems on the network.

The transport layer provides end-to-end reliability by having the destination host communicate with the source host. The end-to-end checks ensure that no intermediate machines that carried the data have failed.

The session layer is used for remote terminal access to a network. Some carriers provide a special purpose host computer called a packet assembler and disassembler (PAD), which has dialup access. Subscribers can call up the PAD, and make a network connection to the host, and the session layer is utilized for this type of connectivity.

The presentation layer includes functions that many application programs need when using the network, such as text compression and graphics conversion into bit streams for transmission across the network.

The application layer includes application programs that use the network, such as electronic mail (e-mail) or file transfer programs. For example, the X.400 standard for electronic mail transfer may be utilized.

In FIG. 1, FIG. 2 and FIG. 3, the software for providing encoding and decoding for each of the layered protocols is housed at the respective source (host A) and destination machines (host B). This leads to a problem in providing a layered protocol in a time-efficient manner, since the same central processing unit (CPU) in the machine must be utilized by all of the protocol software units at the same time, in a time-shared manner. Thus, each of the software units compete with each other in terms of grabbing enough CPU time to encode/decode their respective protocol layer at the machine. Further, the CPU must be of sufficient capability to provide the necessary encoding/decoding for each of the layers.

SUMMARY OF THE INVENTION

It is an object of the invention to provide a system for encoding or decoding a layered protocol in an efficient and cost-effective manner.

To accomplish this and other objects, there is provided a protocol accelerator. The protocol accelerator includes a first processor programmed to encode and decode a first protocol layer. The protocol accelerator also includes a second processor coupled to the first processor and programmed to encode and decode the second protocol layer. The protocol accelerator further includes a third processor coupled to the second processor and programmed to encode and decode a third protocol layer.

There is also provided a method for processing a multilayer protocol related to incoming communications. The method includes a step of decoding a first protocol layer in a first processor. The method also includes a step of decoding a second protocol layer in a second processor. The method further includes a step of decoding a third protocol layer in a third processor.

There is also provided a method for processing a multilayer protocol related to incoming communications. The method includes a step of encoding a first protocol layer in a first processor. The method also includes a step of encoding a second protocol layer in a second processor. The method further includes a step of encoding a third protocol layer in a third processor.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DETAILED DESCRIPTION

In the conventional systems described above, sending a message from an application program on one machine to an application program on another machine in a multiple layer protocol environment means that the message must be transferred down successive layers of protocol software on the sender's machine, then transferred across the network, and then the message is transferred up through the successive layers of protocol software on the receiver's machine.

Figure 1:
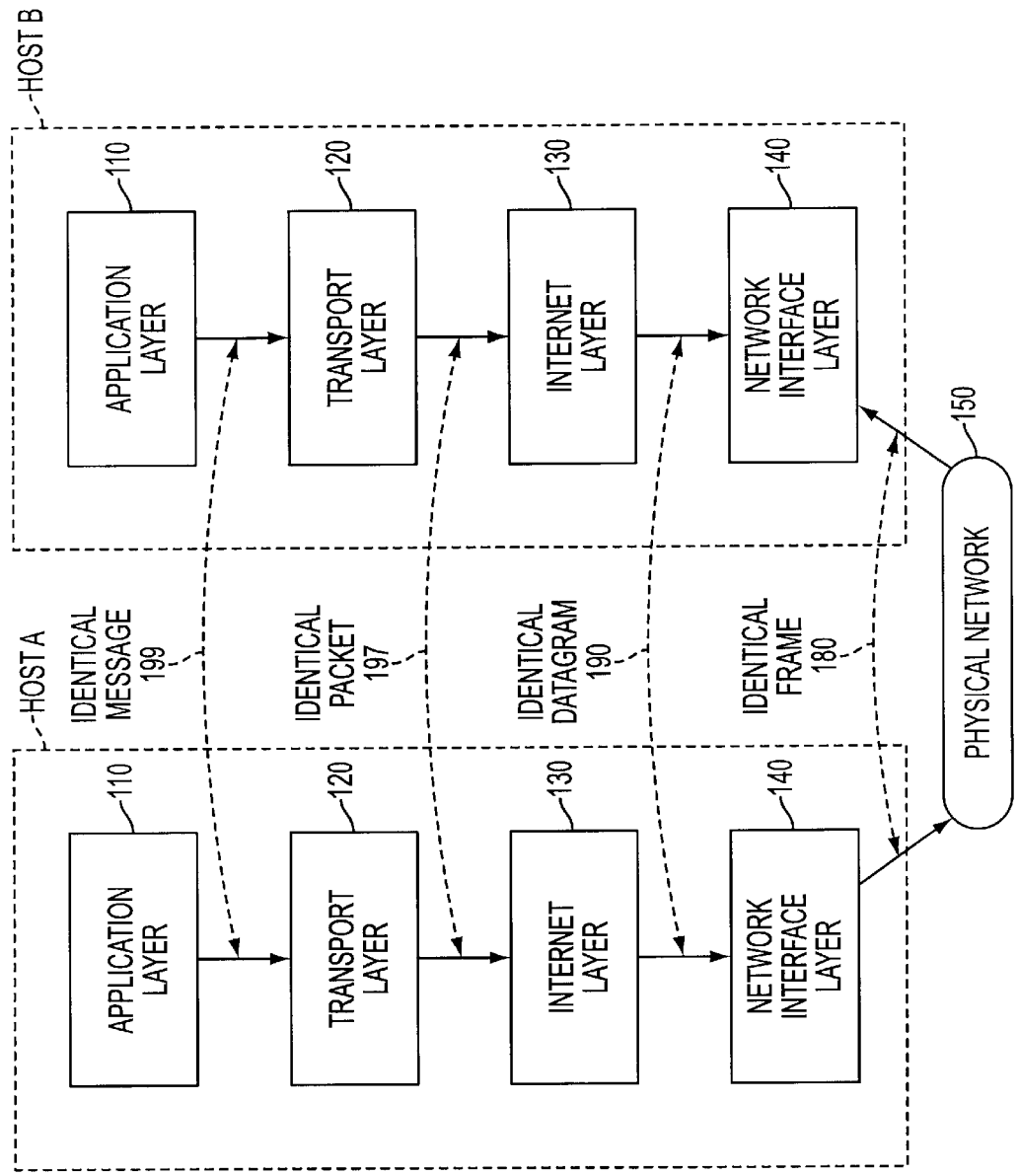
FIG. 1 shows a layered protocol for use in a data transfer from one machine to another machine over a single data network.
Figure 2:
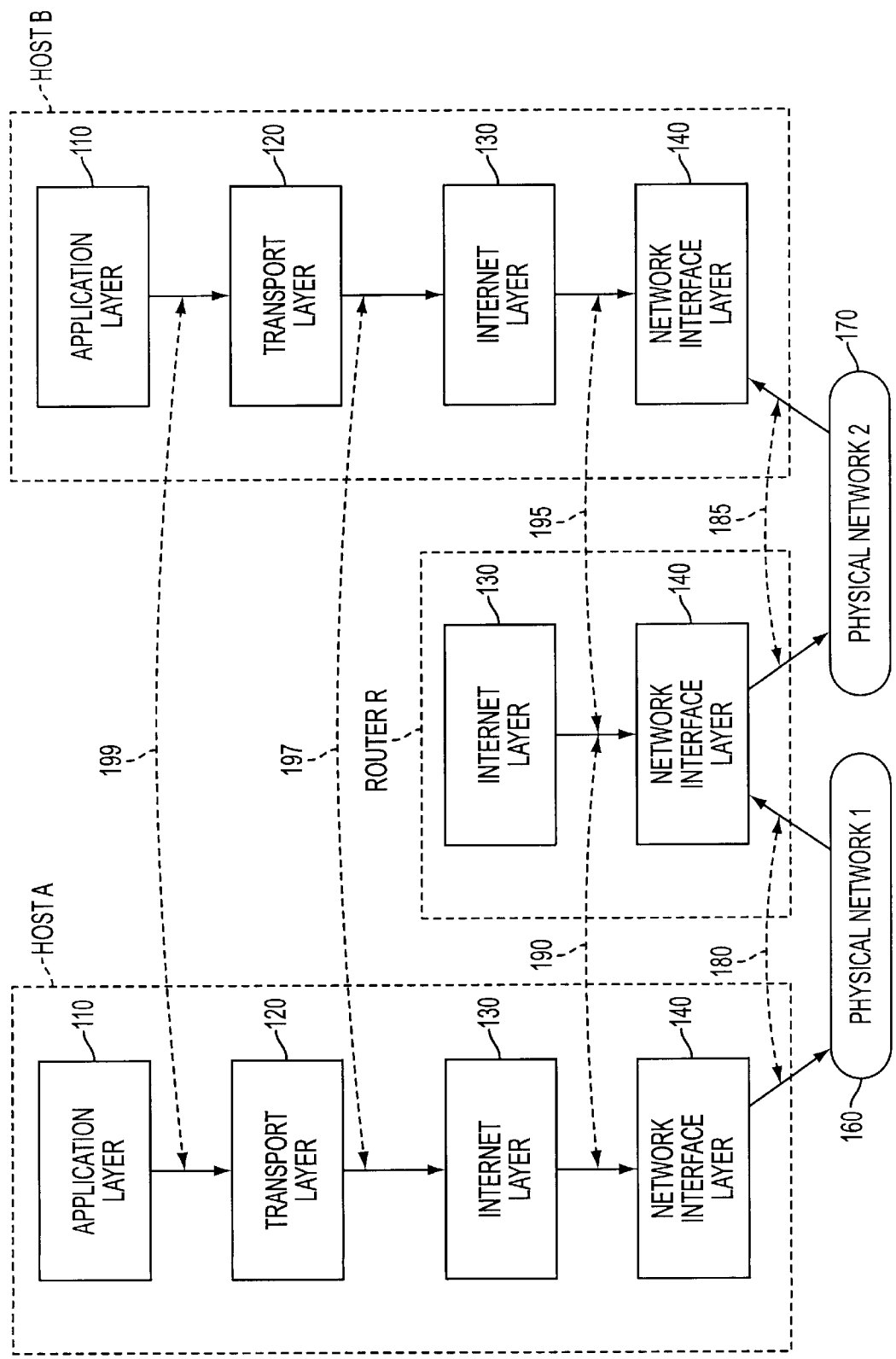
FIG. 2 shows a layered protocol for use in a data transfer from one machine to another machine over a first and a second network, using a router between the networks.
Figure 3:
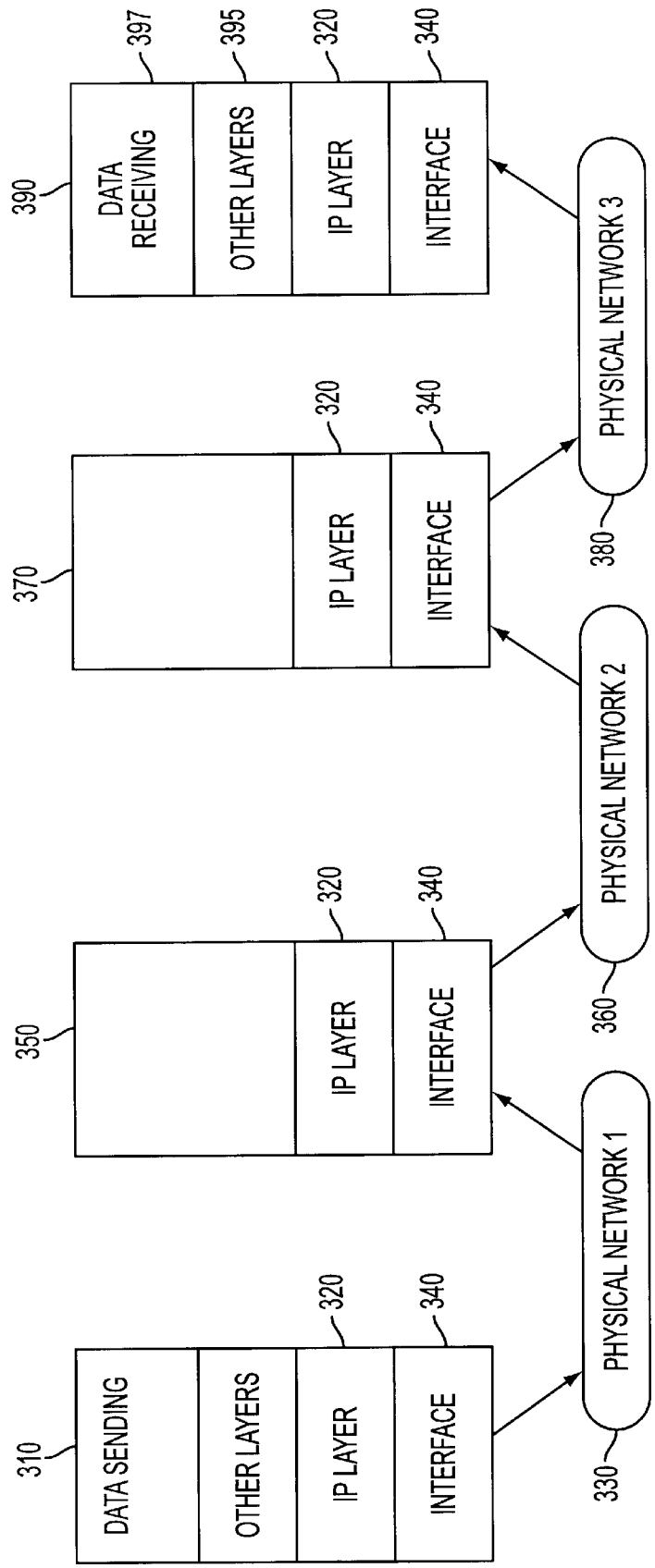
FIG. 3 shows how the different layers of protocol are used when a message is sent from one machine to another machine via intermediate machines.
Figure 4:
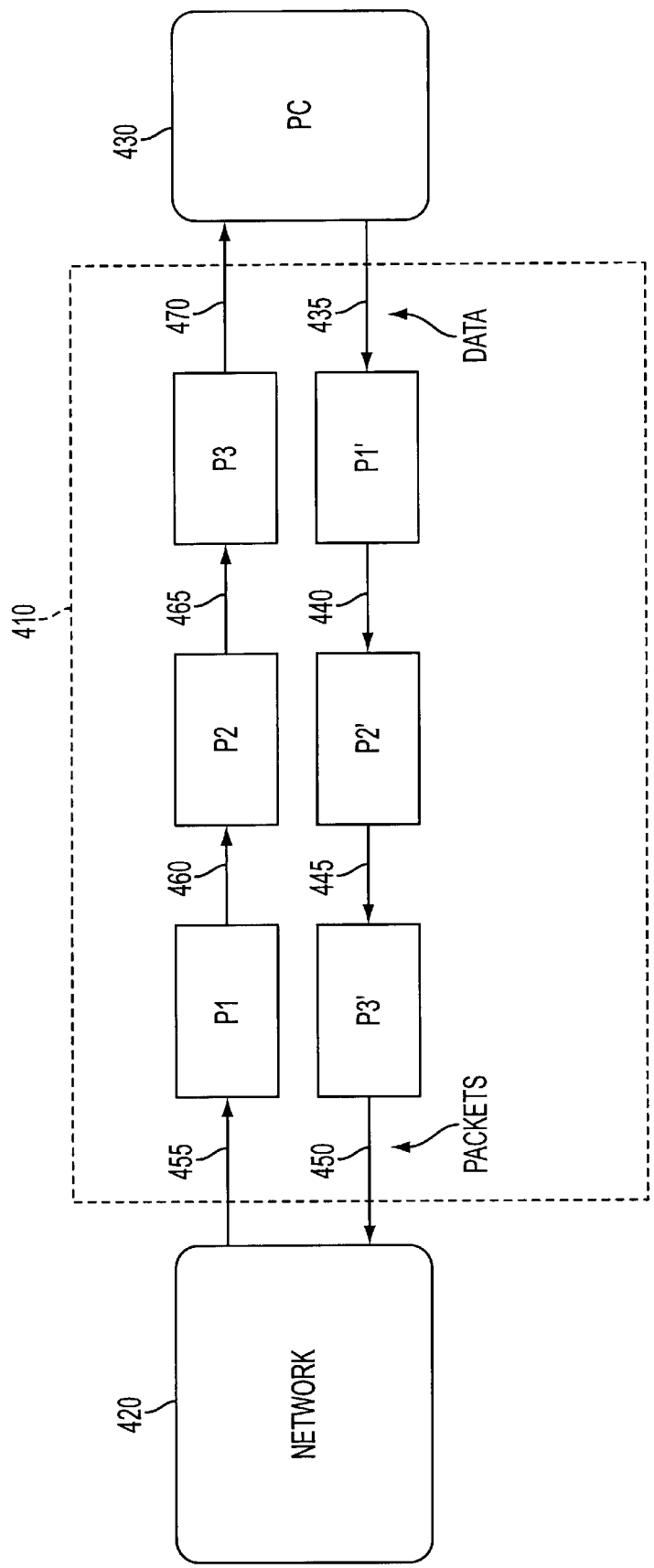
FIG. 4 is a block diagram of the system according to the invention.

Consequently, there is a desire to have a system which can provide protocol layering in a time-efficient and cost-effective manner. In view of these desires, the system according to the invention as shown in FIG. 4 has been designed. The system provides protocol acceleration by assigning separate processing units to different stages, or layers, so that protocol encoding and decoding is performed in a pipelined fashion. In other words, a separate, dedicated processor is assigned to encode/decode each level of the protocol engine.

In FIG. 4, each processor is dedicated to a particular protocol layer, and they are shown being housed in a network interface 410 which is located between the network 420 and the source, such as a personal computer 430. For example, processor P1' is dedicated to provide encoding for the highest protocol layer, processor P2' is dedicated to provide encoding for the next highest protocol layer, and processor P3' is dedicated to provide encoding for the third highest (in this case, the lowest) protocol layer.

In the configuration shown in FIG. 4, processor P1' is connected to receive data over line 435 from the source machine 430. Processor P1' is connected to processor P2' via line 440, and processor P2' is connected to processor P3' via line 445. The configuration as shown in FIG. 4 is for a three-layered protocol, and of course it can be easily modified to suit any number of layers. For example, if the ISO layered protocol is to be used, then there would be seven processors sequentially connected to individually provide the encoding of the seven layers.

As shown in FIG. 4, the processor assigned to encode the lowest protocol layer, P3', is directly connected to the network 420 via line 450. The data is sent via packets on the line 450 to the network 420, and thus the network 420 is a packet switched network. Alternatively, the network 420 can be any other type of network, such as a time-division-multiplexed data network, in which data is sent at particular time frames, and not necessarily as packets of data.

Also shown in FIG. 4 is a second sequential connection of processors P1, P2, and P3 in a second pipelined configuration. The processors P1, P2 and P3 provide the necessary decoding of the three-layered protocol from the network 420 to the source machine 430. The processor P1 provides the decoding of the lowest protocol layer, and the processor P1 is directly connected to the network 420 via line 455. The processor P2 is connected to the processor P1 via line 460, and the processor P2 provides the decoding of the middle protocol layer. Lastly, the processor P3 is connected to the processor P2 via line 465, and the processor P3 provides the decoding of the highest protocol layer. The processor P3 is connected to the source machine 430 via line 470, which is used to send data to the source machine 430.

Thus, there are two separate pipelined arrangements of processors utilized in the system according to the invention in order to provide the stages of protocol layers to provide communications from a source machine to a destination machine over a network.

The arrangement of processors in a pipelined fashion allows for protocol acceleration, since the CPU of each processor is dedicated to only one task, that being the task of providing the requisite protocol layer assigned to the processor in which the CPU is housed. With the system according to the invention, less powerful processors can be utilized for each of the protocol layers. For example, a 80186 processor can be used for each of the processors P1, P2, P3, P1', P2', P3'. That way, older-version processors (i.e., '1186's, '286's) which previously had no usefulness due to improvements in processor design, can now be utilized for the pipelined protocol conversion structure as shown in FIG. 4.

Each of the '186 processors are cascaded with protocol-specific logic, stored in a non-volatile memory of the respective processor. For example, processor P2 has a ROM (not shown), in which the software required to perform decoding of the middle protocol layer is stored therein. Each of the 186 processors also are configured to have non-volatile readable-writable control store to enable efficient protocol processing of the data.

Thus, data can be easily encoded and decoded in a suitable layered protocol format from a personal computer to a network, by using dedicated processors in a pipelined manner.

With the structure as shown in FIG. 4, multiple packets of data can be simultaneously provided with protocol conversion at different protocol layers at the same time. For example, assume that the host machine has output three separate contiguous frames of data, a first frame of data output at time t1, a second frame of data output at time t2 after time t1, and a third frame of data output at time t3 after time t2.

Using the structure of the system as shown in FIG. 4, the first frame of data is being packetized and provided with a lowest protocol layer by processor P3'. At the same time, the second frame of data is being provided with a middle protocol layer by processor P2'. Similarly, at the same time, the third frame of data is being provided with a highest protocol layer by processor P1'. That way, the pipelined arrangement of processors allows for parallel processing of data that is output from the host machine to be sent on the network, and data that is received from the network to be input to the host machine.

This arrangement is faster and cheaper than the conventional approach of a single, powerful processor, such as an AMD 29000, that is assigned to provide the protocol layering for each of the layers of the particular protocol to be utilized.

In a second embodiment, the pipelined structure may be utilized only for certain ones of the protocol layers, such as the middle third, fourth, and fifth protocol layers of the ISO protocol. This alternative embodiment is based on the particular requirements for each of the protocol layers, in which it may be desirable to provide separate processors for certain layers, but in which it is desired to maintain a more powerful processor to handle a combination of the other layers. In one example, there would be a single processor assigned for providing both the sixth and seventh layers. The single processor would be connected to a processor assigned to provide the fifth layer. The processor assigned to provide the fifth layer would be connected to the processor assigned to provide the fourth layer. The processor assigned to provide the fourth layer would be connected to a processor assigned to provide the third layer. The processor assigned to provide the third layer would be connected to a single processor assigned to provide both the second and first protocol layers. Thus, the second embodiment maintains the sequential connection of processors, but some of the processors are dedicated to provide protocol layering for more than one protocol.

Also, although the system as shown in FIG. 4 shows two separate pipelined stages respectively provided for data received from the network and data to be sent on the network, in a third embodiment, the system would be configured as a single pipelined stage, in which the respective processors would be responsible for providing both encoding and decoding of a corresponding protocol layer based upon whether the data is coming in to the source machine or is being sent from the source machine. Thus, the protocol functions performed by processor P1 and P1' in FIG. 4 would be performed by a single processor, the protocol functions performed by processor P2 and P2' in FIG. 4 would be performed by a second processor, and the protocol functions performed by processor P3 and P3' would be performed by a third processor. Alternatively, the functions performed by processor P1 and P3' would be performed by a single processor, the functions performed by processor P2 and P2' would be performed by a second processor, and the functions performed by processor P3 and P1' would be performed by a third processor. Either way, a single pipeline of processors would be utilized in this embodiment.

While there has been illustrated and described what is at present considered to be preferred embodiments of the invention, it will be understood by those skilled in the art that various changes and modifications may be made, and equivalents may be substituted for elements thereof, without departing from the true scope of the invention. In addition, many modifications may be made to adapt a particular situation or material to the teachings of the invention without departing from the central scope thereof. Therefore, it is intended that this invention not be limited to the particular embodiments disclosed as the best mode contemplated for carrying out the invention, but that the invention will include all embodiments falling within the scope of the original claims.

What is claimed is:

1. A method of processing a multilayer protocol related to incoming and outgoing communications, comprising the steps of:

decoding, in a first processor, a first protocol layer for a received packet;

thereafter, decoding, in a second processor a second protocol layer for the received packet;

thereafter, decoding, in a third processor, a third protocol layer for the received packet;

encoding, in the first processor, the third protocol layer for a packet-to-be-transmitted;

thereafter, encoding, in the second processor, the second protocol layer for the packet-to-be-transmitted; and thereafter, encoding, in the third processor, the first protocol layer for the packet-to-be-transmitted.

2. A method as recited in claim 1, wherein the third processor decodes the third protocol layer of communications for which the second protocol layer was previously decoded by the second processor.

3. A method as recited in claim 2, wherein the second processor decodes the second protocol layer of communications for which the first protocol layer was previously decoded by the first processor.

4. A method as recited in claim 3, wherein the first, second and third processors operate simultaneously on different communications.

5. A method as recited in claim 1, wherein the third processor encodes the first protocol layer of communications for which the second protocol layer was previously encoded by the second processor.

6. A method as recited in claim 5, wherein the second processor encodes the second protocol layer of communications for which the first protocol layer was previously encoded by the first processor.

7. A method as recited in claim 1, wherein the first, second and third processors operate simultaneously on different communications.

8. A protocol accelerator, comprising:

a first processor exclusively dedicated to encode a first protocol layer and to decode a third protocol layer;

a second processor coupled to the first processor and exclusively dedicated to encode and decode a second protocol layer; and a third processor coupled to the second processor and exclusively dedicated to encode the third protocol layer and to decode the first protocol layer.

9. A protocol accelerator as recited in claim 8, wherein the third processor encodes the third protocol layer of communications for which the second protocol layer was previously encoded by the second processor.

10. A protocol accelerator as recited in claim 9, wherein the second processor encodes the second protocol layer of communications for which the first protocol layer was previously encoded by the first processor.

11. A protocol accelerator as recited in claim 8, wherein the first, second and third processors operate simultaneously on different communications.

12. A method of processing a multilayer protocol related to incoming communications, comprising the steps of:

decoding, in a first processor, a first protocol layer for a received packet;

thereafter, decoding, in a second processor, a second protocol layer for the received packet; and thereafter, decoding, in the second processor, a third protocol layer for the received packet.

* * * * *